United States Patent Office 3,484,351
Patented Dec. 16, 1969

3,484,351
PROCESS FOR MAKING FILM TYPE HOT MELT ADHESIVES USING FAR ULTRAVIOLET LIGHT
Yoichi Okada, Tsutomu Watanabe, Koji Hirai, and Kazutoshi Fujii, Yokohama, Japan, assignor to Sumitomo Bakelite Company Limited, Tokyo, Japan, a corporation of Japan
Filed Mar. 6, 1967, Ser. No. 621,042
Claims priority, application Japan, Mar. 11, 1966, 41/14,690, 41/14,691
Int. Cl. B01j 1/10
U.S. Cl. 204—159.2        4 Claims

ABSTRACT OF THE DISCLOSURE

When far ultraviolet ray of 2,100–1,600 A., especially of 1849 A., radiated from a low pressure mercury lamp whose tube wall is made of high purity quartz is irradiated in the presence of oxygen on a thermoplastic resin film, the surface irradiated of the resin film becomes very reactive at the time of melt-adhesion, whereby hot melt adhesives extremely effective in bonding metals, wood materials, laminates, papers and the like are obtained.

Heretofore, so-called hot melt type adhesives are already known and characterized in that thermoplastic resin is melt-coated on a surface to be bonded or that the resin prepared in the form of tapes, films, ropes, powders or the like is placed between the surfaces to be bonded, and then the resultant composition is heated under pressure. As for this type of adhesives, however, so-called structural bonding, adhesive strength comparable to mechanical strength of the materials themselves to be bonded cannot be obtained, since this type of adhesion is only due to intermolecular Van-der-Waals force or anchor effect at the interfaces between the thermoplastic resin and the materials to be bonded. Furthermore, such adhesives can only be useful in bonding thin materials, and therefore it is not possible to obtain laminates useful for structural materials and the like by use of said adhesives.

The present invention relates to film type hot melt adhesives.

An object of the present invention is to improve adhesive strength of hot melt adhesives by irradiating far ultraviolet ray thereon.

Another object of the present invention is to provide adhesives that are suitable to obtain laminates combined with the characteristics of the materials to be bonded, particularly such as those having metal being strongly bonded to a synthetic resin or other materials.

It is a further object of the present invention to provide adhesives having very strong bonding strength and being excellent in durability, weather-resistance and water-resistance.

It is a further object of the present invention to provide adhesives of high bonding strength, which are also easy to handle.

Figure 1:
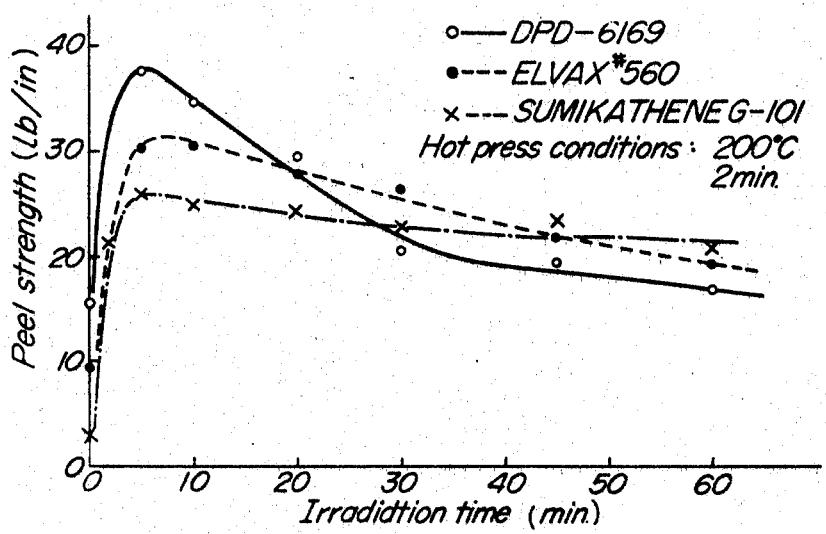
Figure 2:
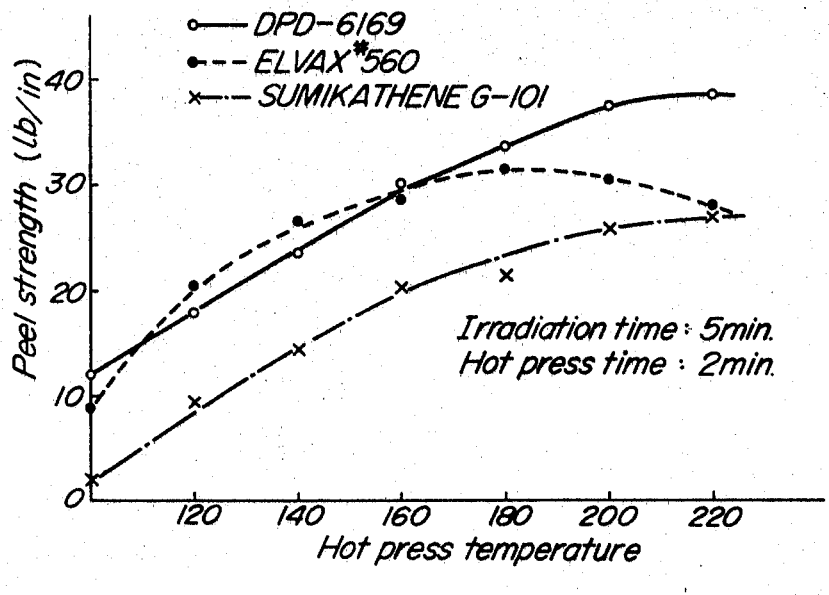
Figure 3:
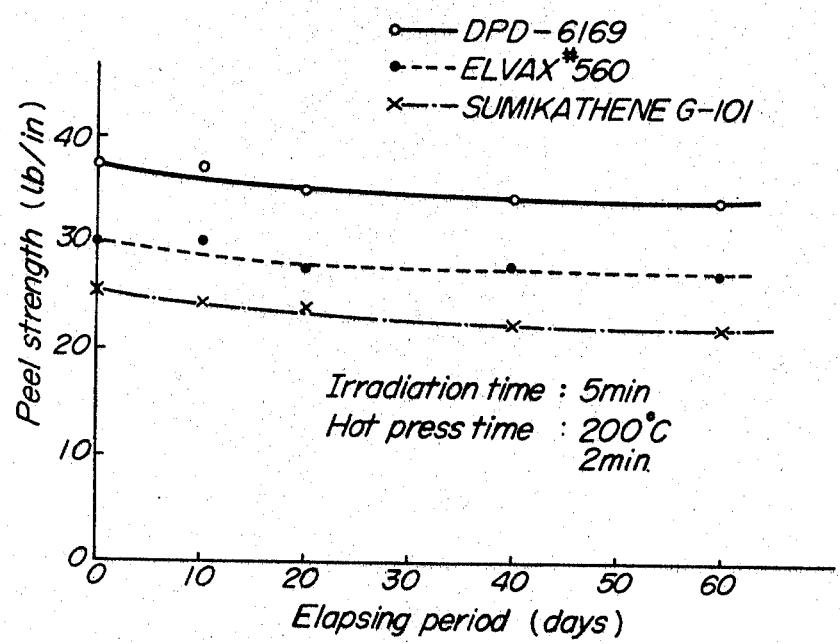

Accompanying drawings show the changes of bonding strength of the present adhesives observed in various cases, that is:

FIG. 1 shows the change of adhesive strength with the irradiation time of far ultraviolet ray, FIG. 2 shows the change with the temperature at the time of hot melt adhesion, and FIG. 3 shows the change with the storage period after irradiation of the far ultraviolet ray.

The present invention concerns a film type hot melt adhesive whose adhesive properties are improved by irradiating far ultraviolet ray of a wave length of 2,100–1,600 A. especially of 1,849 A., on a thermoplastic resin film in the presence of oxygen.

The thermoplastic resin film employed in the present invention consists mainly of a polymerization-type polymer containing in the molecule at least 20% in molar ratio of repeating structural units having the following general formula:

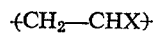
$-(CH_2-CHX)-$ wherein X is a member selected from the group consisting of hydrogen and phenyl group; a vinyl chloride resin containing 20–50% by weight of a plasticizer containing in the molecule a linear alkylene group represented by the following general formula:

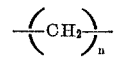

$-(CH_2)_n-$ wherein $n$ is an integer not smaller than 2; or polyphenylene oxides having the following general formula:

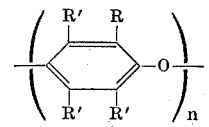

wherein R is hydrogen or an aliphatic hydrocarbon group not containing tertiary α-carbon atoms, R' is R, halogens, aryl hydrocarbon groups, halohydrocarbon groups or aliphatic hydrocarbonoxy groups not containing tertiary α-carbon atoms, and $n$ is an integer not smaller than 100. If necessary, other resins, modifiers, or other additives may be admixed therewith for the purpose of improvement, and the mixture is formed into a film by conventional methods. The term "film" used herein means that the thickness is from ten $\mu$ to 1 mm.

The above-mentioned polymerization-type polymer containing in the molecule the repeating structural units (wherein units means repeating units in the polymerization-type polymer and not always means structural units of monomers) having the general formula:

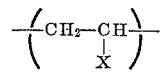

(wherein X is a member selected from the group consisting of hydrogen and phenyl group) includes: homopolymers of ethylene, styrene, butadiene, isoprene, chloroprene and the like; copolymers of ethylene with α-olefine such as propylene, butene-1, or isobutylene, or with styrene, substituted styrenes, vinyl acetate, vinylidene chloride, methyl methacrylate, ethyl acrylate, diethyl maleate, diethyl fumarate, acrylonitrile, or vinyl butyl ether; copolymers of styrene with α-methyl styrene, substituted styrene such as methyl, styrene, dimethyl styrene, chlorostyrene, bromostyrene, iodostyrene, methoxystyrene, nitrostyrene, dimethyl amino styrene or p-vinyl benzoic acid, or with acrylonitrile, methacrylonitrile, esters of acrylic acid, esters of methacrylic acid, maleic anhydride, esters of maleic acid, esters of fumaric acid, vinyl acetate, vinyl-ketone, alkyl vinyl ethers, butadiene, or isobutylene; and copolymers of butadiene with styrene, substituted styrenes, acrylonitrile, methacrylonitrile, methyl vinyl ketone, esters of acrylic acid, esters of methacrylic acid, vinylidene chloride, vinyl pyridine, or isobutylene. Herein, copolymers mean copolymers in any type of random copolymers, graft copolymers, or block copolymers depending on kind of monomer and method of polymerization. Further, as the polymerization-type polymer in the present invention, there can be used random copolymers, block copolymers, graft copolymers, or blend-type copolymers, which comprise three main components of acrylic compounds, conjugated diolefines, and aromatic vinyl compounds (hereinafter called ABS). Said acrylic compounds include acrylonitrile, methacrylonitrile, α-chloroacrylonitrile, methyl methacrylate, butyl methacrylate, ethyl acrylate, butyl acrylate, methyl α-chloroacrylate, acrylic acid, and methacrylic acid. Said conjugated diolefines include butadiene, isoprene, dimethyl butadiene, chloroprene, cyclopentadiene, methyl pentadiene, 1,1,4,4-tetra-methyl butadiene, pyperylene, myrcene, and alloocymene. Said aromatic vinyl compound include styrene, α-methyl styrene, methyl styrene, α-methyl-p-methyl styrene, butyl styrene, α-chlorostyrene, dichlorostyrene, and β-vinyl naphthalene.

The plasticizer containing in the molecule linear alkylene group represented by the general formula:

(wherein $n$ is an integer not smaller than 2) includes: alkyl esters of phthalic acid such as dibutyl phthalate, dioctyl phthalate and dilauryl phthalate; alkyl esters of phosphoric acid such as trioctyl phosphate and tri-2-ethylhexyl phosphate, alkyl esters of aliphatic dibasic acids such as dibutyl adipate, di-2-ethylhexyl adipate, dibutyl sebacate and dibutyl azealate; polyglycol esters such as triethylene glycol capronate, triethylene glycol dihexoate, diethylene glycol adipate, diethylene glycol sebacate and di-1,3-butylene glycol adipate; alkyl esters of benzoic acid such as oleyl benzoate; esters of higher aliphatic monobasic acid such as phenyl oleate and hexyl stearate; epoxides such as epoxidized octyl stearate and epoxidized glycerides of vegetable oil; chloride such as chlorinated paraffin, methyl stearate pentachloride, dichloride methyl cellosolve stearate. Any plasticizer which is generally employed in vinyl chloride may be used provided that it contains the linear alkylene group expressed by the above-mentioned general formula. It is more desirable to employ a plasticizer having long alkylene group.

The vinyl chloride resin is homopolymer of vinyl chloride, a copolymer of vinyl and other monomers copolymerizable therewith, or a mixture thereof. The said copolymer contains at least 60% in molar ratio of monomeric vinyl chloride unit. If necessary, other resins, modifiers or additives may be admixed to improve the properties thereof.

The polyphenylene oxides previously described are film-formable polymer which are obtained by the method of Japanese Patent No. 293,059 (G. E., Applicant).

An ordinary ultraviolet ray lamp cannot be used as the light source because far ultraviolet ray having wave lengths of 2,100–1,600, especially of 1,849 A., is absorbed into its tube wall. In the present invention, a low pressure mercury lamp whose tube wall is of high purity quartz has a purity not lower than 99.90%. Impurities such as titanium and iron are preferably not higher than 10 p.p.m. to prevent the decrease of optical transmittance of quartz by solarization. When a mercury lamp having such tube wall material is employed, it is possible to obtain far ultraviolet ray having wave lengths 2,100–1,600 A., especially of 1,849 A., in a practical amount. A quartz whose purity is about 99.95% can be gained by means of repeating recrystallization of the quartz on the market. In the case of using this quartz for the low pressure mercury lamp and making its wall thickness 10 mm., the transmittance of the ray in the range of 2,100–1,600 A., especially of 1,849 is 40–50%. In the case of a quartz of 10 mm. thickness having a purity not lower than 99.99% such as synthetic fused silica, for example Spectrosil, Vireosil OS (both being trade names of The Thermal Syndicate), and Suprasil (trade name of Heraus & GMBH), the transmittance reaches 90% or higher and thus very efficient. Usually the thickness of tube wall is in the range of 0.5–5 mm.; however, the lower the purity is, the thinner the tube wall should be. Inside the low pressure mercury lamp, a few droplets of mercury are enclosed together with a rare gas such as helium, neon, argon, xenon, or krypton. Occasionally, sodium vapor also may be added besides the mercury and rare gas. To begin with irradiation, it is preferable to maintain the mercury vapor pressure inside the tube in the range of $5 \times 10^{-4} – 1 \times 10^{-1}$ mm. Hg by cooling a part of the lamp. Below $5 \times 10^{-4}$ mm. Hg, radiation intensity is insufficient; above $1 \times 10^{-1}$ mm. Hg, the content of far ultraviolet ray having short wave lengths of 2,100–1,600 A., especially of 1,849 A., decreases because of self-absorption of mercury vapor. The shape of low pressure mercury lamp may be any kind of shape such as tubular, globular, U-letter, or spiral. In the case of tubular shape, a lamp having a diameter of 10–60 mm. and a distance between electrodes of 10–200 cm. is preferably used. Preferably, the electric output of lamp is 5–300 W. per a lamp, and the output per 1 cm. of the distance between electrodes is 0.2–2 w.

Using a low pressure mercury lamp as above-mentioned as the source of far ultraviolet ray having short wave lengths of 2,100–1,600 A., especially of 1,849, A., and keeping irradiation distance between the lamp and the thermoplastic resin film in the range of 0.5–20 cm., conduct far ultraviolet ray irradiation treatment. If the irradiation distance is shorter than 0.5 cm., temperature of the lamp rises up too highly. If the irradiation distance is longer than 20 cm., there arise disadvantages in the effect of irradiation, the size of apparatus, and so on. Time of the irradiation treatment is preferably about 1–60 minutes. If it is too long, the irradiation effect is reduced. So is the bonding strength. Further, the too long time is expensive. Substantially sufficient irradiation time is within 30 minutes. As to the irradiation amount which means the product of light intensity by irradiation time, it is only necessary to adjust the light intensity of 2,100–1,600 A., especially of 1,849 A., on the irradiated surface to be 0.1–10 mw./cm.$^2$, preferably 0.3–3 mw./cm.$^2$. The irradiation amount may be calculated, therefore, to be 6,000 to $3.6 \times 10^{-7}$ μwsec./cm.$^2$. The light intensity can be measured by passing the light through a lithium fluoride filter which has been colored by irradiation with X-ray or γ-ray, irradiating the resulting monochromatic light to a thermocouple, and amplifying the induced thermoelectric current. It can also be measured by passing the light through a diffraction grating, irradiating the resulting spectrum to a photoelectric tube and amplifying the induced photoelectric current. It can be measured according to still other methods. Usually, the light intensity on a perpendicular plane at a given distance from the lamp is measured in air and is represented in the unit of μw./cm.$^2$.

It is necessary to conduct irradiation treatment in the presence of oxygen; in the atmosphere of nitrogen or inert gas, any prominent effect on bonding strength does not appear. During irradiation, surface temperature of the thermoplastic resin film is not particularly limited. Usually, the irradiation can be conducted in the range from room to considerably high temperature, that is, temperature near the felting point.

The irradiation of far ultraviolet ray is applied on both surfaces of thermoplastic film; however, in the case the film is so thin as of 0.3 mm. or less thickness, the irradiation may be applied on one surface only with sufficient results whereby the unirradiated surface is also activated and exhibits high adhesive strength. The resulting film type hot melt adhesives retain the excellent adhesive properties for more than two months, thus, they are highly advantageous in practical use such as transportation, storage and so on. It is also remarkable that the far ultraviolet ray irradiation treatment retains its effects for an extended period of time, compared with the fact that the corona discharge treatment on polyolefine resins to improve adhesive properties retains its effects only for one week or so.

When the thermoplastic resin films employed in the present invention are used, as it is, without the far ultraviolet ray treatment, as hot melt adhesives, they cannot be used for structural materials and the like. Even through they adhere, or adhere to a certain extent, it cannot be said that they have enough adhesive strength as high as structural bonding. On the contrary, when the adhesives of the present invention resulted from far ultraviolet ray irradiation treatment are used, extremely high adhesive strength almost equivalent to structural bonding ultraviolet ray irradiation treatment improves adhesive strength of hot melt adhesives remarkably and provides them with excellent durability. That is, such treatment is an excellent improvement for hot melt adhesives. It can be said that the thus obtained adhesives are hot melt adhesive whose efficiency is remarkably improved.

Hithertofore, that ultraviolet ray is effective or oxidation of synthetic resin is apparent from the fact that a synthetic resin is degraded by the sunlight as well known. Also it is well known that ultraviolet ray irradiation is effective as a treating method to improve printability of polyethylene and the like. However, in the case of natural ultraviolet ray, rays of wave lengths shorter than 2,100 A. are absorbed in the upper layer of the atmosphere, so ultraviolet ray reaching the earth hardly contains wave length shorter than 2,100 A. Also in the case of ultraviolet ray lamps on the market, rays of wave lentgh shorter than 2,100 A. are absorbed into the tube wall and therefore any irradiation effects of far ultraviolet ray having wave lengths of 2,100–1,600 A., especially of 1,849 A., have never been been observed and have been overlooked in practical utilization. When ultraviolet ray having a wave length longer than 2,100 A. is irradiated on polyethylene or the like for a long period of time, some improvement in bondability can be observed so far as bonding is effected by the use of an adhesive, but it is hardly possible to obtain a strong bonding employing the resin itself as a hot melt adhesive. In addition, in the above case, the synthetic resin itself is degraded during the long time of irradiation and becomes impractical. On the other hand, rays having wave length shorter than 500 A. such as X-ray show so great penetration through the resins, that they give no prominent effects of improving bondability, and the resin itself is considerably degraded, becoming impractical. However, when the resin subjected to irradiation treatment with only far ultraviolet ray having wave lengths as short as 2,100–1,600 A.), especially of 1,849 A., is employed as hot melt adhesives, such a unique effect that its bondability is extremely improved, thereby to make a strong and firm structure adhesion possible. From the fact that the effects of far ultraviolet ray having wave lengths of 2,100–1,,600 A., especially of 1,849 A., requires the presence of oxygen, it is considered that a certain chemical changed dus to an oxidation reaction on the film surfaces is caused to give an improved wettability required for bonding metals or inactive synthetic resins, or intensify the intermolecular primary bonds, or to weaken the intersurface stress.

In practicing the bonding by use of the adhesives of the present invention, it is preferable to select the adhesives which have properties satisfying the conditions for easy bonding, such as chemical or physical compatibility, or wettability after taking into consideration of the properties of materials to be bonded.

In bonding a meatl with a synthetic resin, for example, in the case of aluminum and polypropylene, ethylene polymers having chemical affinity for polypropylene are preferred. In the case of aluminum and polyvinyl chloride, those having chemical affinity for polyvinyl chloride such as copolymers containing ester groups, nitrile rubber, ABS resins and the like are preferred. The adhesives of the present invention are made highly active for adhesion, and therefore they are widely applicable.

The adhesives of the present invention are extremely effective especially in bonding a metal with a synthetic resin or other material.

Said metals include aluminum, copper, iron and the alloys consisting of any of these metals as main component and one or more of magnesium, manganese, nickel, cobalt, chromium, titanium, tin, zinc, lead, bismuth, cadmium, beryllium, thallium, and silicon. Such alloys include stainless steel, duralumin and brass. The metals also include so-called tin plate (steel plate on which surface tin is subjected to hot galvanizing), galvanized steel sheet (steel sheet on which surface zinc plating is applied) and steel plate on which surface chromium oxide coating is applied.

Said synthetic resins include almost all sorts of resins such as polyvinyl chloride, polystyrene, nylon, phenolic resins, diallyl phthalate resins, and melamine resins as well as thermoplastics resin which have been heretofore said to be difficult to adhere such as polyethylene, polypropylene, polytetrafluoroethylene and polychlorotrifluoroethylene. As other material, there may be included inorganic boards, wood material, plywoods, fiber boards, particle boards, leathers, clothes and papers.

Usually these materials to be bonded may be employed in various shapes such as foils, sheets, boards and foamed sheets. They may be also employed in uneven shapes or curved surfaces.

The adhesives of the present invention is used by placing it between the materials to be bonded as mentioned above and heating the resultant laminates under pressure to carry out hot melt adhesion. It may be carried out either by press or roll. The bonding temperature should be not lower than the melting point of the adhesives, however, it may be from 120 to 220° C., preferably 140–220° C. Pressure upon the bonding may be from the contact pressure to 80 kg./cm.$^2$, though it may vary depending on the kind of materials to be bonded. The hot bonding time, in the case of using a press, is 0.5–60 minutes, preferably 2–20 minutes. In the case of using roll, though the pressing time is difficult to determine, it is sufficient to pass the sheet through 5–20 couples of hot roll at a rate of 5–200 m./hr. Too long hot melt bonding time is rather meaningless because the effect of bonding decreases. After the melt adhesion, cooling is conducted. It is possible to remove the sheet out of the press or the rolls and to cool them as they are, but in this case it is due to the difference of coefficients of thermal expansion between the materials to be bonded that inner stress remains to some extent. Hence, it is preferable to conduct cooling by means of a cold press or cold rolls.

When the adhesives of the present invention are employed, strong bond can be gained by a very simple method. The effect is particularly remarkable in the case of bonding a metal with a synthetic resin or other material. However, in bonding a metal, roughening treatment can improve the bond strength further more. For example, this treatment includes mechanical roughening by means of emery paper abrasion, sandblast, or liquid forming using as abrasive sand, silica, silicon carbide, alumina, chromium oxide, rouge, lime or metal grit, and the like; chemical roughening using a single or mixed aqueous solutions of inorganic acids such as phosphoric acid, nitric acid, sulfuric acid, hydrochloric acid, hydrofluoric acid, chromic acid, or an aqueous alkaline solution containing sodium hydroxide or potassium hydroxide; and electrolytic roughening in an aqueous solution containing perchloric acid, phosphoric acid, sulfuric acid, nitric acid or the like. When the adhesive of the present invention is suitably applied to the materials to be bonded according to usage of the product, the kind of the metal, the kind of the synthetic resin, i.e., the bond strength having much less fatigue against bending and repeated folding (toughness), compared with the conventional treatment methods, and having good durability again etching treatment and soldering immersion treatment and the like, which are required for electric equipments.

In this specification, a peel strength representing bonding strength is according to ASTM D903–49. It is measured to melt and bond with a metal sheet to be measured the surface of a specimen of a synthetic resin sheet of 1 inch width and 4 inches lengths whose back surface is lined with a metal sheet of 1 mm. thickness, and to peel off that metal sheet by an Air-Micro type testing machine at a peeling rate of 5 mm./min. in the direction of 180° when the thickness of the metal sheet is more than 0.15

The relationships between adhesive strength and the combination of the metals and the synthetic resins are shown in Table 1.

For the purpose of comparison, the data of the cases wherein the unirradiated film is employed, and the synthetic resin which has been subjected to the far ultra violet ray irradiation treatment for 10 minutes and the metals are bonded without using the film between them, are also shown in said table.

TABLE 1

| Example | Metal (thickness, 0.3 mm.) | Treatment of the metal | Thin film type adhesive material [1] (thickness, 0.2 mm.) | Synthetic resin (thickness, 3.0 mm.) | Hot melt temperature (°C.) | Peel strength (lb./in.) |
|---|---|---|---|---|---|---|
| 1 | Iron | Phosphoric acid [2] | Unemployed | Irradiated polypropylene | 220 | 4.0 |
|   |   |   | Sumikathene G-101 | Polypropylene | 220 | 11.9 |
|   |   |   | Irradiated Sumikathene G-101 | do | 220 | 23.4 |
| 2 | Aluminum | Unabrased | Unemployed | Irradiated polypropylene | 200 | 0 |
|   |   |   | Elvax No. 560 | Polypropylene | 200 | 16.5 |
|   |   |   | Irradiated Elvax No. 560 | do | 200 | 30.2 |
| 3 | Iron | Abrased [3] | Unemployed | Irradiated polypropylene | 200 | 0 |
|   |   |   | Elvax No. 560 | Polypropylene | 200 | 8.4 |
|   |   |   | Irradiated Elvax No. 560 | do | 200 | 21.0 |
| 4 | Stainless Steel | Abrased | Unemployed | Irradiated polypropylene | 200 | 0 |
|   |   |   | Elvax No. 560 | Polypropylene | 200 | 7.7 |
|   |   |   | Irradiated Elvax No. 560 | do | 200 | 25.4 |
| 5 | Aluminum | Abrased | Unemployed | Irradiated polypropylene | 220 | 0 |
|   |   |   | Sarlin A No. 1602 | Polypropylene | 220 | 4.6 |
|   |   |   | Irradiated Sarlin A No. 1602 | do | 220 | 15.3 |
| 6 | Stainless Steel | Abrased | Unemployed | Irradiated polypropylene | 180 | 0 |
|   |   |   | EPR-NC | Polypropylene | 180 | 4.2 |
|   |   |   | Irradiated EPR-NC | do | 180 | 21.8 |
| 7 | Aluminum | Abrased | Unemployed | Irradiated polyvinyl chloride | 180 | 0 |
|   |   |   | Elvax No. 560 | Polyvinyl chloride | 180 | 7.6 |
|   |   |   | Irradiated Elvax No. 560 | do | 180 | 17.3 |
| 8 | Aluminum | Unabrased | Unemployed | Irradiated polyvinyl chloride | 180 | 0 |
|   |   |   | Hycar No. 1432 | Polyvinyl chloride | 180 | 3.0 |
|   |   |   | Irradiated Hycar No. 1432 | do | 180 | 15.2 |
| 9 | Copper | Abrased | Unemployed | Irradiated polyvinyl chloride | 180 | 0 |
|   |   |   | Blendex No. 101 | Polyvinyl chloride | 180 | 8.9 |
|   |   |   | Irradiated Blendex No. 101 | do | 180 | 19.0 |
| 10 | Aluminum | Unabrased | Unemployed | Irradiated poly (methyl methacrylate) | 200 | 0 |
|   |   |   | Hycar No. 1432 | Poly (methyl methacrylate) | 200 | 5.1 |
|   |   |   | Irradiated Hycar No. 1432 | do | 200 | 16.6 |
| 11 | Stainless Steel | Abrased | Unemployed | Irradiated poly (methyl methacrylate) | 220 | 0 |
|   |   |   | Cyclolac T-1000 | Poly (methyl methacrylate) | 220 | 0 |
|   |   |   | Irradiated Cyclolac T-1000 | do | 220 | 18.7 |
| 12 | Aluminum | Abrased | Unemployed | Irradiated polyamide (nylon) | 200 | 0 |
|   |   |   | Hycar No. 2057 | Polyamide | 200 | 2.0 |
|   |   |   | Irradiated Hycar No. 2057 | do | 200 | 19.3 |
| 13 | Iron | Abrased | Unemployed | Irradiated polyamide (nylon) | 200 | 0 |
|   |   |   | Sumikathene G-101 | Polyamide | 200 | 2.0 |
|   |   |   | Irradiated Sumikathene G-101 | do | 200 | 19.3 |
| 14 | Stainless Steel | Unabrased | Unemployed | Irradiated polypropylene | 200 | 0 |
|   |   |   | DPD-6169 | Polypropylene | 200 | 15.8 |
|   |   |   | Irradiated DPD-6169 | do | 200 | 34.0 |

[1] See the following:
Elvax No. 560 (Du Pont): Ethylene vinylacetate copolymer.
Sarlin A No. 1602 (Du Pont): Ethylene copolymer containing ionic bonds.
EPR-NC (Montecatini): Ethylene-propylene copolymer.
Hycar No. 1432 (The Japanese Geon): Acrylonitrile-butadiene copolymer.
Hycar No. 2057 (The Japanese Geon): Styrenebutadiene copolymer.
Blendex No. 101 (Marbon Chemical): Acrylonitrile-butadiene-styrene copolymer.
Cycolac T-1000 (Marbon Chemical): Acrylonitrile-butadiene-styrene copolymer.
Sumikathene G-101 (Sumitomo Chemical): Low density polyethylene.
DPD-6169 (U.C.C.): Ethylene-ethyl acrylate copolymer.
[2] Immersed in a mixed solution of 50 parts of phosphoric acid and 50 parts of methanol, for 10 minutes, and then washed with water.
[3] Abrasion is made in each example by roughening with 80 mesh sandpaper.

mm., or alternatively, at a peeling rate of 50 mm./min. in the direction of 90° in case said thickness is less than 0.15 mm.

A shear strength is according to ASTM D1002–53T and shows the strength in drawing at overlapped area of 1 inch × 1½ inch and at a rate of 5 mm./min.

Hereinafter, the examples of the present invention will be illustrated. The ratios of reagents for chemical treatments in the examples are represented by parts by weight.

EXAMPLES 1–14

After cleaning both surfaces of various thermoplastic resin films of 0.2 mm. thickness with toluene, far ultra violet ray radiated from a straight type low pressure mercury lamp of 60 w. whose tube wall is of high purity—99.98%—optical quartz at 127 v. and 600 ma. was irradiated on the surfaces at 2 cm. distance for 10 minutes in air.

These irradiated film type hot melt adhesives were placed between various metal sheets and synthetic resin sheets which are difficult to make hot melt adhesion with the metal, and subjected to a hot melt adhesion by employing a hot press at various temperatures and at a pressure of 20 kg./cm.² for 5 minutes.

EXAMPLE 15

A film of Elvax No. 560 of 0.5 mm. thickness is subjected to 10 minutes irradiation of far ultraviolet ray as in Example 1, and placed between an aluminum sheet of 0.5 mm. thickness washed with trichloroethylene and a plywood of 5.5 mm., followed by a hot melt adhesion at 200° C. The peel strength of this when peeling off the aluminum sheet was 28.4 lb./in.²

When unirradiated Elvax No. 560 film was employed, it was 11.8 lb./in.²

Example 16

Example 15 is repeated except that a phenolic foam was employed in place of the plywood and the hot melt adhesion is carried out at 180° C. When peeling off the aluminum sheet, this foam was found to be destroyed.

When unirradiated Elvax No. 560 film was employed, the aluminum sheet was easily peeled from the foam.

Example 17

Example 15 was repeated except that a white cardboard was employed in place of the plywood and the hot melt adhesion was carried out at 180° C. When peeling off the aluminum sheet, the surface layer of the white cardboard was found to be destroyed.

When unirradiated Elvax No. 560 film was employed, the aluminum sheet was easily peeled from the white cardboard.

EXAMPLE 18

Low density polyethylene film (Sumikathene G-101, Sumitomo Chemical) was subjected to the far ultraviolet ray irradiation as in Example 1 for 5 minutes, placed between an unabrased aluminum sheet of 0.1 mm. thickness and a hard board of 3.5 mm. thickness, and subjected to a hot melt adhesion at 180° C. and at a pressure of 15 kg./cm² for 2 minutes. The cases where both surfaces of the film were subjected to the far ultraviolet ray irradiation, only one surface contacting with the aluminum was subjected to the irradiation and the film was unirradiated, are compared in Table 2.

TABLE 2

| Film thickness (mm.) | Peeled appearance* | | | |
|---|---|---|---|---|
| | 1.0 | 0.5 | 0.3 | 0.2 |
| Unirradiated | 1 | 1 | 1 | 1 |
| One surface irradiated | 2 | 3 | 4 | 4 |
| Both surfaces irradiated | 5 | 5 | 5 | 5 |

* The appearance of the specimen of 1 in. width peeled off by a hand was observed and evaluated:
  1—The aluminium sheet is not adhered.
  2—Peeled off the hard board, without adhesion of fibers on the film
  3—Peeled off the hard board with adhesion of fibers.
  4—Peeled off the hard board, with heavily adhesion of fibers.
  5—The hard board surface layers are entirely destroyed.

EXAMPLES 19-21

Three sorts of films of 0.2 mm. thickness, i.e., low density polyethylene film (Sumikathene G-101), ethylene-vinyl acetate copolymer film (Elvax No. 560) and ethylene-ethyl acrylate copolymer (DPD-6169) were subjected to the far ultraviolet ray irradiation as in Example 1, and subjected to hot melt adhesion by placing each film between an abrased aluminum of 0.3 mm. thickness and iron plate of 0.8 mm. thickness whose surface has been treated with chromic acid. The influence of the far ultraviolet ray irradiation time, the hot press temperature and the storage period after the irradiation on the aluminum peel strength (180° direction) are shown respectively in FIG. 1, FIG. 2 and FIG. 3.

As shown in FIG. 1, the bonding strength of the three films is considerably increased if irradiated far ultraviolet ray for 2-5 minutes, compared with unirradiated cases. Although the long time irradiation tends to decrease the bond strength, comparing with the case of short time irradiation, the effect of improving the bondability is clearly observed in general if the irradiation time is within 60 minutes.

As shown in FIG. 2, when the hot melt adhesion temperature is changed in the case of 5 minutes far ultraviolet irradiation on the three films, it is found that practically sufficient bonding strength is given at a temperature higher than 120-160° though it varies depending on the kind of film. The higher is the temperature, the higher bonding strength is given. In general, a temperature of 220° C. or higher will practically sufficient bond strength, although bond strength of some resin tends to be lowered at an elevated temperature as in the case of ethylene-ethyl acrylate copolymer.

As shown in FIG. 3, three films that were subjected to the far ultraviolet ray irradiation show little lowering tendency of the bond strength when standing at room temperature for a long period of time. In general, the film treated by far ultraviolet ray retains enough practical adhesive strength even when stored for a period more than 2 months, as exemplified in the case of these three films.

EXAMPLE 22

0.3 mm. thick vinyl chloride resin film prepared by addition of 50 parts dioctyl phthalate per 100 parts of polyvinyl chloride was subjected to the far ultraviolet ray irradiation in air from a 60 w. straight type low pressure mercury lamp whose tube wall is of high purity—99.98%—of quartz at 127 v. and 600 ma., keeping 2 cm. distance for 10 mins.

The irradiated vinyl chloride resin sheet was placed between aluminum and a rigid vinyl chloride resin sheet, and subjected hot melt adhesion by use of hot press at 160° C. and at a compressing pressure of 30 kg./cm.² for 2 minutes. When the aluminum sheet is peeled off from the laminate the peel strength was 18.7 lb./in.²

In the case of placing unirradiated film, did not take place.

EXAMPLE 23

A thin film type vinyl chloride resin prepared by addition of 50 parts diethylene glycol-dibenzoate as a plasticizer into 100 parts of polyvinyl chloride was subjected to the far ultraviolet ray irradiation for 10 minutes in air as in Example 22, and placed between an aluminum sheet of 0.5 mm. and a plywood of 5.5 mm., followed by hot melt adhesion at 180° C. the peel strength of this laminate, when the aluminum sheet was peeled off, was 19.5 lb./in.²

In the case of unirradiated film, no bonding occurs.

EXAMPLE 24

After cleaning both surfaces of a polyphenylene oxide film (being made from the pellets of C-1045 of G. E. Co. by means of hot press, at 240° C.) of 0.3 mm. thickness with ethyl alcohol, the far ultraviolet ray irradiation treatment was carried out for 5 mins. in air as in Example 1. The said film was placed between an electrolytic copper foil 0.7 mm. thick and a phenol resin laminate 1 mm. thick, then the resulting laminate was subjected hot metal adhesion by employing a hot press at 230° C. and the pressure of 30 kg./cm.² for 2 mins. When it was peeled off the copper foil, the peel strength (in the direction of 90°) was 11.7 lb./in.². When unirradiated polyphenylene oxide film was employed, it was 3.6 lb./in.²

What is claimed is:

1. A process comprising adhesive obtained by irradiating in the presence of oxygen a thermoplastic resin film with a far ultraviolet ray having a wave length of 1849 A. of a light intensity of 0.1–10 mw. per square centimeter of said film surface for about 1 to 60 minutes, from a source which is a low pressure mercury lamp the tube wall of which is of high purity quartz; wherein the purity is at least 99.90%, said resin being a member selected from the group consisting of (a) a polymer containing in the molecule at least 20% in molar ratio of the repeating structural units having the following general formula:

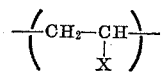

wherein X is a member selected from the group consisting of hydrogen and phenyl group, (b) a vinyl chloride resin containing 20-50% by weight of a plasticizer containing in the molecule a linear alkylene group represented by the following general formula:

wherein $n$ is an integer not smaller than 2, and (c) a polyphenylene oxide.

2. The process according to claim 1, wherein the thermoplastic resin is a member selected from the group consisting of polyethylene and copolymers of ethylene and other monomer copolymerizable with ethylene.

3. The process according to claim 1, wherein the thermoplastic resin is a member selected from the group consisting of polybutadiene and copolymers of butadiene and other monomer copolymerizable with butadiene.

4. A film type hot melt adhesive according to claim 1, wherein the thermoplastic resin is a vinyl chloride resin containing dioctyl phthalate as a plasticizer.

References Cited

UNITED STATES PATENTS 2,845,541   7/1968   Berry et al. _____ 204—159.2
3,146,146   8/1964   Anderson _____ 204—159.2

MURRAY TILLMAN, Primary Examiner

R. B. TURER, Assistant Examiner

U.S. Cl. X.R.

204—159.14; 260—47, 94.9, 93.5, 31.8, 94.7